| United States Patent [19] | [11] | 4,095,991 |
|---|---|---|
| Falcoz et al. | [45] | Jun. 20, 1978 |

[54] ENHANCEMENT OF HETEROPOLYSACCHARIDE SOLUBILITY

[75] Inventors: Pierre Falcoz, Champagne au Mt d'Or; Pierre Celle, Caluire; Jean-Claude Campagne, Mell, all of France

[73] Assignee: Rhone-Poulenc Industries, Paris, France

[21] Appl. No.: 652,323

[22] Filed: Jan. 26, 1976

[30] Foreign Application Priority Data

Jan. 31, 1975  France .................................. 75 03640

[51] Int. Cl.² ............................ C08L 5/00; C08B 9/00
[52] U.S. Cl. ..................... 106/208; 536/114; 536/119
[58] Field of Search ...................... 536/114, 115, 119; 106/208

[56] References Cited

U.S. PATENT DOCUMENTS

| 3,232,929 | 2/1966 | McNeely et al. ..................... 536/114 |
| 3,313,800 | 4/1967 | Jackson, Jr. et al. ................ 536/114 |
| 3,679,658 | 7/1972 | Yueh et al. ........................... 536/114 |
| 3,849,341 | 11/1974 | Lamberti .............................. 536/115 |

*Primary Examiner*—Johnnie R. Brown
*Attorney, Agent, or Firm*—Bacon & Thomas

[57] ABSTRACT

The water solubility of certain heteropolysaccharide salts of calcium is enhanced by effecting the dissolution thereof conjointly with an organic acid or anhydride thereof having at least one pK value between 5 and 7, the calcium salt or salts of such organic acid or anhydride itself or themselves being soluble in water.

11 Claims, 1 Drawing Figure

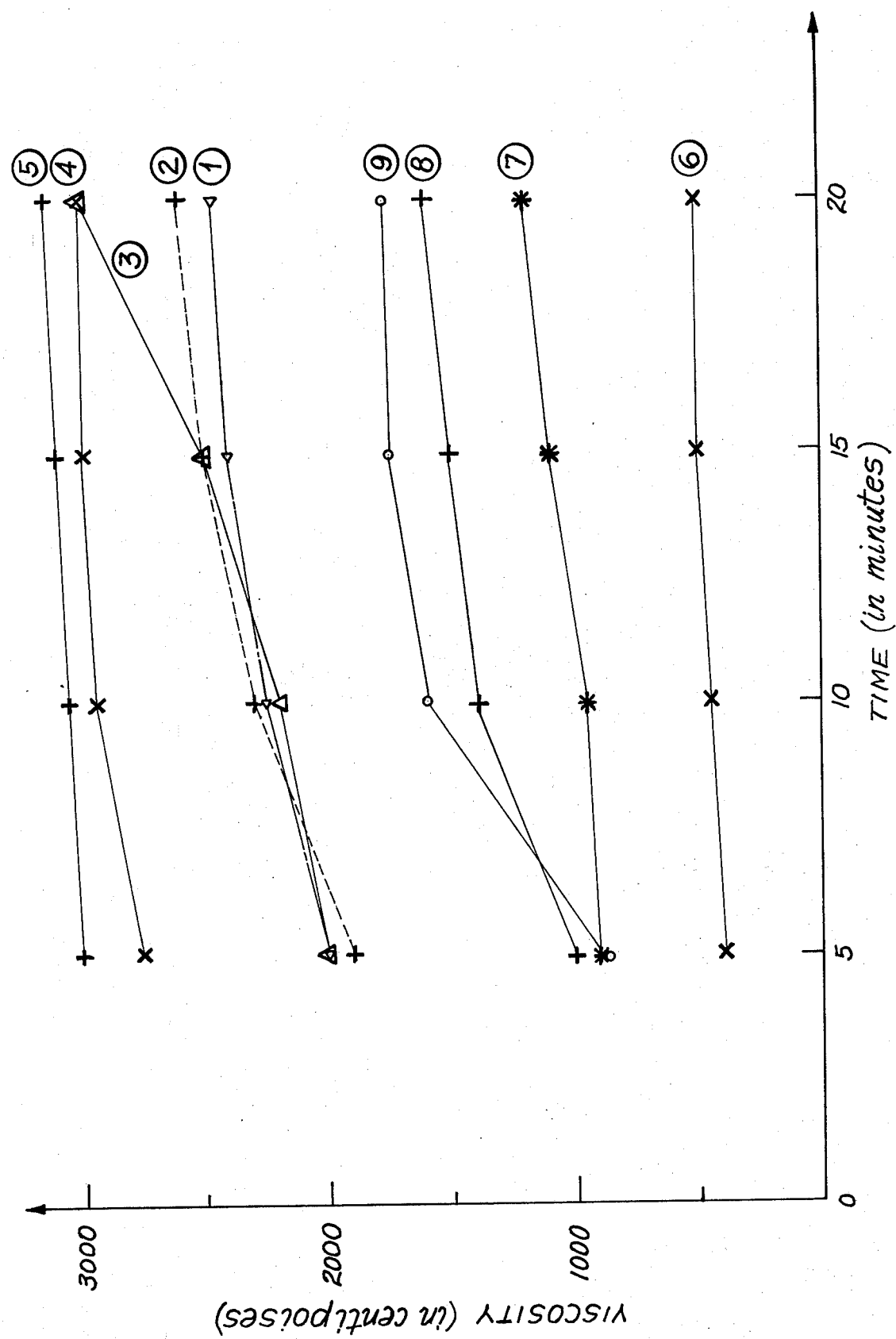

ENHANCEMENT OF HETEROPOLYSACCHARIDE SOLUBILITY

BACKGROUND OF THE INVENTION

1. Field of the Invention

The present invention relates to enhancing the dissolution of certain heteropolysaccharides in aqueous media and, more especially, to increasing the viscosity over time of such heteropolysaccharide solutions by effecting the dissolution of the said heteropolysaccharide conjointly with at least one organic acid or anhydride thereof having at least one pK of a value between 5 and 7. The invention also relates to a novel composition of matter comprising the said heteropolysaccharide and the said organic acid or anhydride thereof.

2. Description of the Prior Art

In an effort to increase the viscosities of a variety of aqueous media over a wide pH range and a wide range of salt contents, it is not uncommon in the prior art to utilize as the viscosity increasing ingredient those heteropolysaccharides obtained through fermentation of carbohydrates by means of bacteria of the genus Xanthomonas.

According to one of the known methods for the preparation of such heteropolysaccharides, the biopolymer is precipitated from the reaction mixture in the form of a complex calcium salt. This precipitation is effected, for example, by precipitating calcium hydroxide, in situ, via addition of sodium hydroxide solution and calcium chloride to the must resulting from the fermentation. Another method of precipitation includes charging the fermented must into milk of lime. Compare U.S. Pat. No. 3,232,929. In each instance, the precipitate is collected according to conventional techniques, such as filtration, and is then dried, e.g., in a ventilated oven, and ground. The biopolymer is thus converted to powder form.

Nevertheless, the subsequent use of such calcium salt of the biopolymer presents a vexing problem by reason of the poor water solubility thereof.

SUMMARY OF THE INVENTION

It has now been determined that the speed of hydration or solubility of the complex calcium salt of the biopolymer, prepared by the action of calcium hydroxide on the fermented must, is quite low and that the product generates considerable alkalinity due to the presence of free lime.

It has also now been determined that the partial or complete neutralization of the alkalinity of the biopolymer suspension in water renders it possible to substantially increase the speed of hydration or dissolution of the product. Thus, it has been considered and even proposed to acidify the mixture with a typical acid such as, for example, a strong inorganic acid, e.g., hydrochloric acid, sulfuric acid, or the like. However, this alternative has not met with satisfactory results because by a process contrary to that of the insolubility or non-hydration of the biopolymer in a strongly alkaline medium, the presence of a high concentration of hydrogen ions in the medium partially inhibits the dissolution or hydration characteristics of the product.

Accordingly, it is a primary object of the present invention to provide for the enhanced dissolution of the subject biopolymer in aqueous media.

Other objects, features and advantages of the invention will become more apparent from the following detailed description of the invention, from the FIGURE of drawing and from the claims.

BRIEF DESCRIPTION OF THE DRAWING

The FIGURE of drawing is a graph of viscosity versus time reflecting the enhanced water solubility of the biopolymer according to the invention in comparison with the hydration techniques of the prior art.

DETAILED DESCRIPTION OF THE INVENTION

It has now been determined according to the invention that the water solubility of calcium salts of those heteropolysaccharides obtained through fermentation of carbohydrates by means of bacteria of the genus Xanthomonas is markedly enhanced by effecting said dissolution in the presence of at least one organic acid, or anhydride thereof, having at least one pK value in the range of between 5 and 7, the calcium salt or salts of such organic acid or anhydride itself or themselves being soluble in the aqueous media. In a preferred embodiment of the invention, the calcium salt of the heteropolysaccharide is admixed with the organic acid or anhydride prior to introducing the same into the aqueous media. And the uncombined admixture of the heteropolysaccharide with either the organic acid or anhydride too is a novel composition of matter. Thus, this invention also provides that novel composition of matter comprising a calcium salt of those heteropolysaccharides obtained through fermentation of carbohydrates by means of bacteria of the genus Xanthomonas, together with any organic acid or anhydride thereof, having at least one pK value in the range of between 5 and 7, and the calcium salt or salts of such organic acid or anhydride itself or themselves being soluble in water.

As hereinbefore mentioned, the calcium salts of the subject heteropolysaccharides are prepared in accordance with those methods well known to the art. As such, and because these preparations are well known to those skilled in the art and are readily available from the technical literature, detailed processes for the preparation of the heteropolysaccharides, per se, or the actual fermentation of the carbohydrates, are not here given.

It has furthermore been determined that only those organic acids or corresponding anhydrides having at least one pK value of between 5 and 7 render it possible to achieve such ionization of the liquid media which is compatible with high speed of hydration or dissolution of the biopolymer. By "pK" there is intended the dissociation constant measured in water at ambient temperatures.

Moreover, the calcium salt or salts of the said organic acids or anhydrides thereof must be soluble in water. In fact, if the converse were true, then the ensuing precipitation of a salt which would be insoluble in the medium to which it had been added to increase the viscosity thereof, would constitute a manifestly unacceptable result.

Suitable organic acids meeting the aforesaid criteria include maleic acid, citric acid, itaconic acid, citraconic acid, gluconic acid, or the like, and mixtures thereof. Suitable anhydrides include maleic anhydride, itaconic anhydride, citraconic anhydride, and the like.

The preferred amount of the acid or anhydride to be admixed with the biopolymer depends on the individual nature of the said acid or anhydride under consideration, and is generally determined experimentally. However, it can generally be said that the particular amount usually falls within the range of from between about 5 to 25% by weight, based upon the weight of the polysaccharide.

In order to further illustrate the present invention and the advantages thereof, the following specific examples are given, it being understood that same are intended merely as illustrative and in nowise limitative.

EXAMPLES 1 TO 5

Five compositions according to the invention were prepared by adding, to a powdered calcium salt of a heteropolysaccharide obtained by fermentation of carbohydrates by means of bacteria of the genus Xanthomonas, certain amounts of certain organic acids or anhydrides thereof, said acid and anhydrides being selected via preliminary experimentation. The resultant compositions were such as to permit total dissolution of the biopolymer. Thus, the following compositions were prepared:

Table I

| Composition | Acid or Anhydride | pK of the acid | % of the acid or anhydride, by weight, relative to the weight of the biopolymer |
|---|---|---|---|
| 1 | Maleic acid | 1.9–6.0 | 20% |
| 2 | Citric acid | 3.14–5.95–6.39 | 13% |
| 3 | Citraconic acid | 2.47–5.62 | 10% |
| 4 | Citraconic anhydride | See value given for corresponding acid | 10% |
| 5 | Maleic anhydride | See value given for corresponding acid | 12.5% |

Each composition was dissolved by introducing same into water under gentle stirring at ambient temperature. The speed of hydration or dissolution of the biopolymer was characterized by the increase in the viscosity of the solution with time. This viscosity was measured by means of a model LVT Brookfield viscometer, module No. 3, at a speed of 10 rpm. Readings were taken discontinuously at the following times:

$t_0 = 0$ minutes [upon complete addition of each composition]
$t_1 = t_0 + 5$ minutes
$t_2 = t_0 + 10$ minutes
$t_3 = t_0 + 15$ minutes
$t_4 = t_0 + 20$ minutes and are expressed in centipoises.

The results obtained are illustrated in the single figure of drawing.

COMPARATIVE EXAMPLES 6 to 9

Compositions of biopolymer and acids which are not within the scope of the invention were prepared and tested under the same conditions as above.

Table II

| Composition | Acid | pK of the acid | % of the acid, by weight, relative to the weight of the biopolymer |
|---|---|---|---|
| 6 | Boric | 9.14–12.7–13.8 | 12% |
| 7 | Picric | 0.38 | 47% |
| 8 | Formic | 3.77 | 10% |
| 9 | Hydrochloric | Entirely dissociated | 10% |

These results are also seen in the single figure of drawing.

It can thus quite readily be seen that the acids and anhydrides within the scope of the invention afford a much greater increase in viscosity over time and, hence, a greater speed of hydration or dissolution.

While there have been described and pointed out the fundamental novel features of the invention as applied to the preferred embodiments, those skilled in the art will appreciate that various modifications, changes and omissions in the enhancement of heteropolysaccharide solubility illustrated and described can be made without departing from the spirit of the invention. It is the intention, therefore, to be limited only by the scope of the following claims.

What is claimed is:

1. The method of enhancing the solubility in water of a calcium salt of a heteropolysaccharide obtained through fermentation of carbohydrates by means of bacteria of the genus Xanthomonas, which method comprises effecting the dissolution of such calcium salt, in an aqueous medium, conjointly with at least one member selected from the group consisting of an organic acid and an anhydride of such organic acid, said at least one member having at least one pK value between 5 and 7, and the calcium salt or salts of said at least one member being soluble in water.

2. The method as defined by claim 1, wherein the dissolution is effected with an organic acid, said organic acid being selected from the group consisting of maleic acid, citric acid, itaconic acid, citraconic acid and gluconic acid.

3. The method as defined by claim 1, wherein the dissolution is effected with an organic acid anhydride, said organic acid anhydride being selected from the group consisting of maleic anhydride, itaconic anhydride and citraconic anhydride.

4. The method as defined by claim 1, wherein the organic acid or anhydride thereof is present in an amount of from between 5 and 25% by weight, based upon the weight of the heteropolysaccharide.

5. The method as defined by claim 1, wherein the heteropolysaccharide is dissolved in powder form.

6. A composition of matter adapted as a viscosity increasing additive for aqueous media, said composition comprising [1] a calcium salt of a heteropolysaccharide obtained through fermentation of carbohydrates by means of bacteria of the genus Xanthomonas, and [2] at least one member selected from the group consisting of an organic acid and an anhydride of such organic acid, said at least one member having at least one pK value between 5 and 7, and the calcium salt or salts of said at least one member being soluble in water.

7. The composition of matter as defined by claim 6, wherein the component [2] is an organic acid selected from the group consisting of maleic acid, citric acid, itaconic acid, citraconic acid and gluconic acid.

8. The composition of matter as defined by claim 6, wherein the component [2] is an organic acid anhydride selected from the group consisting of maleic anhydride, itaconic anhydride and citraconic anhydride.

9. The composition of matter as defined by claim 6, wherein the component [2] is present in an amount of from between 5 and 25% by weight, based upon the weight of the component [1].

10. The composition of matter as defined by claim 6, wherein the component [1] is in powder form.

11. A solution, in an aqueous medium, of the composition of matter as defined by claim 6.

* * * * *